(12) United States Patent
Guggenbuhl et al.

(10) Patent No.: US 7,674,826 B2
(45) Date of Patent: Mar. 9, 2010

(54) USE OF A NUTRACEUTICAL COMPOSITIONS IN ANIMAL FEED

(75) Inventors: Patrick Guggenbuhl, Sainte-Croix-en-Plaine (FR); Carlos Simoes-Nunes, Village-Neuf (FR)

(73) Assignee: DSM IP Assets B.V., Heerlen (NL)

( * ) Notice: Subject to any disclaimer, the term of this patent is extended or adjusted under 35 U.S.C. 154(b) by 0 days.

(21) Appl. No.: 12/159,152

(22) PCT Filed: Feb. 21, 2007

(86) PCT No.: PCT/EP2007/001471

§ 371 (c)(1),
(2), (4) Date: Jun. 25, 2008

(87) PCT Pub. No.: WO2007/104407

PCT Pub. Date: Sep. 20, 2007

(65) Prior Publication Data

US 2009/0042990 A1 Feb. 12, 2009

(30) Foreign Application Priority Data

Mar. 10, 2006 (EP) .................................. 06004899

(51) Int. Cl.
*A61K 31/19* (2006.01)
(52) U.S. Cl. ...................................................... 514/568

(58) Field of Classification Search .................. 514/568
See application file for complete search history.

(56) References Cited

U.S. PATENT DOCUMENTS

| 5,562,916 A * | 10/1996 | Van Ooijen ................. 424/442 |
| 6,322,807 B1 | 11/2001 | Van Ooyen |
| 2003/0114435 A1 | 6/2003 | Tani et al. |
| 2005/0064018 A1 | 3/2005 | Simoes-Nunes et al. |

FOREIGN PATENT DOCUMENTS

| EP | 0 567 352 | 10/1993 |
| GB | 1 466 003 | 3/1977 |

OTHER PUBLICATIONS

Broulik, P.D. et al., "Effects of Triiodothyronine and Estrogen Administration on Bond Mass, Mineral Content and Bone Strength in male Rats", Hormone and Metabolic Research, vol. 35, No. 9, pp. 527-531, (Sep. 2003).
Anonymous: "Opinion of the Scientific Committee on Animal Nutrition on the Use of Benzoic Acid in Feedingstuffs for Pigs for Fattening", Internet Citation, [Online], pp. 1-20, (2002).

* cited by examiner

*Primary Examiner*—Raymond J Henley, III
(74) *Attorney, Agent, or Firm*—Nixon & Vanderhye P.C.

(57) ABSTRACT

This invention relates to the novel use of a composition comprising benzoic acid or a derivative of benzoic. It has been found surprisingly that the long-term ingestion of benzoic acid by swine was followed by a significant increase of the bone resistance and mineralization. The benzoic acid or its derivative can be administered to the animal either in its feed composition or in its drinking water.

6 Claims, No Drawings

USE OF A NUTRACEUTICAL COMPOSITIONS IN ANIMAL FEED

This application is the U.S. national phase of International Application No. PCT/EP2007/001471, filed 21 Feb. 2007, which designated the U.S. and claims priority to Europe Application No. 06004899.8, filed 10 Mar. 2006, the entire contents of each of which are hereby incorporated by reference.

The present invention relates to a novel use of a nutraceutical composition for animals, especially pigs, comprising as active ingredient benzoic acid, derivatives or metabolites thereof.

Specific examples of derivatives of benzoic acid which can give rise to benzoic acid in vivo include salts of benzoic acid such as the alkali metal-alkaline earth metal- and ammonium benzoates.

The term "nutraceutical" as used herein denotes an usefulness in both the nutritional and pharmaceutical field of application. Thus, the nutraceutical compositions can find use as a complete animal feed (diet), as supplement to animal feed, and as pharmaceutical formulations for enteral or parenteral application which may be solid formulations, or liquid formulations.

It is known from EP-A-0 683 985 that animal feed compositions comprising benzoic acid or salts thereof can be used to minimize the emission of odoriferous ammonia from organic wastes, especially animal excrements and manure. It is further known that the addition of benzoic acid to the diet of weaner piglets improves the zootechnical performance of the animals.

It has now been found surprisingly that in addition to the above function, benzoic acid and salts thereof have the advantage of being able to improve bone strength in animals, more precisely being able to increase bone resistance and mineralization, which has a significant effect to the general health status of the animal.

The term "bone resistance" as used herein denotes the maximal force in measured in Newton (N) necessary to break the bone determined by a compression machine.

The term "bone mineralization" as used herein denotes the percentage of ash after incineration of the bone compared to the dried bone matter (DM). Dry matter is defined as the weight of the bone sample after 24 hour in a drying oven compared to the initial weight of the sample.

Accordingly, the present invention relates to a composition comprising benzoic acid or a derivative of benzoic acid capable of giving rise to free benzoic acid in vivo for increasing bone strength, preferably bone resistance and mineralization in animals.

Furthermore the present invention relates to the novel use of benzoic acid in order to increase bone resistance and mineralization in animals, especially pigs.

Benzoic acid or a derivative thereof capable of giving rise to benzoic acid in vivo may be administrated to the animals as a component of a nutraceutical composition which is conventionally fed to animals. Thus, benzoic acid and derivatives thereof may be suitably administered to the animals as a component of the animal feed or in their drinking water.

The amount of benzoic acids or a derivative thereof administered to the animal is in the range from 0.001-5% based on the total weight of each feed fed to the animal. This amount may, however, be higher if the function of benzoic acid or a derivative thereof is also to control the pH of the animal excreta fed on such a diet in order to suppress the emission of ammonia from the excreta. Such higher amounts are suitably limited to a maximum of about 10% based on the total animal feed composition.

In a preferred embodiment of the invention benzoic acid or a derivative of benzoic acid being used in an amount sufficient to provide a daily dosage of 200 mg per kg body weight to about 600 mg per kg body weight of the subject to which it is to be administered.

In another aspect the invention relates to a method of feeding animals with a feed (diet), preferably comprising bencoic acid, achieving in the animal the following bone strength parameters: a bone resistance of at least 500 N measured with metacarpal bone and/or a bone mineralization of at least 60% of ash compared to the dried bone matter (DM). In a preferred embodiment the feed comprises benzoic acid in an amount sufficient to achieve in the animal the following bone strength parameters: a bone resistance of at least 550 N, preferably 590 to 650 N measured with metacarpal bone.

A typical formulation for an animal feed composition is shown in Table 1 below in which all the amounts shown in % by weight were fed to pigs:

TABLE 1

| Ingredients | % |
|---|---|
| Meat meal (58% Crude protein) | 3.20 |
| Molasses | 5.00 |
| Wheat | 5.90 |
| Soybean meal (45% crude protein) | 15.10 |
| Tapioca (66% starch) | 35.50 |
| Wheat middlings | 15.00 |
| Animal fat | 3.30 |
| Limestone | 0.74 |
| Lysine hydrochloride (98%) | 0.06 |
| Vitamin premix | 0.50 |
| Trace minerals | 0.50 |
| Sunflower meal | 12.20 |
| Amonium chloride | 2.00 |
| Amonium benzoate | 1.00 |

Thus benzoic acid or a derivative thereof may be used in combination with conventional ingredients present in an animal feed composition (diet) such as calcium carbonates, elelctrolytes such as ammonium chloride, proteins such as soya bean meal, wheat, starch, sunflower meal, corn, meat and bone meal, amino acids, animal fat, vitamins and trace minerals.

In such a composition, the ratio of the electrolyte to the benzoic acid or a derivative thereof is suitably in the range from 0.5:1 to 5:1 w/w, preferably from 1.5:1 to 3.1 w/w.

Benzoic acid or a derivative thereof is particularly effective to improve the digestibility of proteins and the assimilation of amino acids and nitrogen in animals such as poultry, pigs or cattle, especially pigs.

The present invention is further illustrated with reference to the following Example, which shows the effects of benzoic acid on the ileal apparent digestibility of nitrogen, energy and amino acids in the ileo-rectal anastomosed piglets Sixty-four Large-White×Landrace×Piétrain weaner piglets having an initial body weight of 8.5±1.11 kg were used. The animals were allocated into two equal groups (A1 and B1) and housed in cages in sub-groups of 6 animals each in an environmentally controlled room. Each cage had a plastic-coated welded wire floor and was equipped with 2 water nipples and 2 stainless-steel feeders. Room temperature was initially 27° C. and was lowered weekly by about 2° C. until 21-22° C. Environment humidity percentage throughout the experiment was 50%. The animals were fed the basal diet (group A1) or the diet A with addition of 0.5% of benzoic acid (VevoVitall®, DSM Nutritional Products ltd, Switzerland) (group B1). Both diets were in mash form. The composition of the diets and the concentration of benzoic acid in the diet B1 are presented in the table 1. The basal diet A1 was formulated to meet the animals' requirements according to Henry et al. (1989, *L'alimentation des animaux domestiques—porc, lapin, volaille*, $2^{nd}$ edition, INRA, Paris) and NRC (1998), which publication is herein incorporated as reference.

After the post-weaning observation the animals of each group were divided into 2 equal groups of 16 animals each and were housed in floor-pen cages in sub-groups of 4 animals each in an environmentally controlled room for an observation period of 91 days. Each pen had a plastic-coated welded wire floor and was equipped with two water nipples and four stainless-steel individualised feeders. Room temperature was 21-22° C. and humidity percentage was 50%. Pigs ingesting during the post-weaning phase the diet without benzoic acid were fed the basal diet (group A2) or the A2 diet supplemented with 1% of benzoic acid (group B2). Pigs fed during the post-weaning phase the diet supplemented with 0.5% of benzoic acid received the A2 diet supplemented with 0.5% of benzoic acid (group C2) or the A2 diet supplemented with 1% of benzoic acid (group D2). The composition of the diets and the concentration of benzoic acid in the diets B2, C2 and D2 are presented in the table 2. All the diets were given in a mash form. The basal diet A2 was formulated to meet the animals' requirements according to Henry et al. (1989) and NRC (1998). The determination of the concentration of benzoic acid was performed according to a standard method.

At the end of the observation all the animals were slaughtered after electronarcosis for the determination of the bone resistance and mineralization. The collected bones were the right internal and external metacarpal. Samples were prepared from each of the collected bones immediately after slaughter. After careful removal of the soft tissue, a diaphysis section was obtained by sawing each bone. The obtained sections of about 3.5-cm long were immediately subjected to compression in order to determine the force in Newton necessary to break them (maximal-breaking force at the fracture point). The measurements were performed with a LR10K compression machine, using a XLC/10K/A1 force captor and a compression device TH23-196/AL (Lloyd Instruments, Fareham, UK). The broken bones were then dried in a drying oven at 105° C. during 24 hours and the dry matter (DM) was used for the determination of ash content, which was measured after 48 h incineration at 550° C. in a muffle furnace.

Statistical treatment of the results involved the calculation of the mean and of the standard deviation as well as a two-factor hierarchical analysis of variance. The mathematical model was:

$$Yijk = \mu + Ai + Bij + Zijk,$$

where $\mu$ is the mean, Ai is the diet effect, Bij is the combined effect of the diet and animal or pen and Zijk is the residual term. The analysis of variance was followed by a Duncan multiple range test when a significant Ai effect without Bij effect was observed (*Statistical methods*, $8^{th}$ edition, Iowa University Press, Ames, Snedecor and Cochran, 1989). These calculations were performed using the Statistical Analysis System (SAS, 1990).

The observed concentration of benzoic acid in the supplemented feed used in both phases of the experiment was in very good agreement with the programmed inclusion levels (tables 1 and 2).

The animals did not present any symptoms of illness during the experiment. Furthermore, no natural mortality was observed and thus all the initial piglets were present during all the duration of the experiment.

The bone resistance was significantly increased in all the supplemented groups (table 3). The mean resistance of the bones of the supplemented animals, groups B2, C2 and D2 represented respectively 128, 127 and 122% of that of the controls. The ash content of the bones of the pigs ingesting supplements of benzoic acid was also increased (table 6). The ash content was significantly higher in the animals of the groups B2 and D2 than in the controls. That of the animals of the group C2 was numerically higher (P<0.07) than that of the controls.

These results clearly show that the long-term ingestion of benzoic acid by swine was followed by a significant increase of the bone resistance and mineralization.

TABLE 1

Composition and characteristics of the experimental diets used during the post-weaning phase

| Ingredients (%) | A1 | B1 |
|---|---|---|
| Soybean meal | | 7.4 |
| Wheat | | 15 |
| Barley | | 29.4 |
| Potato concentrate | | 8 |
| Maize | | 10 |
| Wheat bran | | 1.6 |
| Oatmeal | | 10 |
| Beet pulp | | 5.5 |
| Treacle | | 3.5 |
| Soya oil | | 2.7 |
| Minerals, vitamins and synthetic amino acids | | 6.9 |
| Digestible energy MJ/kg | | 13.9 |
| Crude protein (%) | | 17.7 |
| Crude fat (%) | | 4.9 |
| Lysine (%) | | 1.20 |
| Methionine + Cystine (%) | | 0.75 |
| Phosphorus (%) | | 0.60 |
| Calcium (%) | | 0.75 |
| Benzoic acid % | — | 0.5 |
| Benzoic acid in feed % | — | 0.49 ± 0.02(1) |
| Benzoic acid % of the target | — | 98 |

(1)Mean ± standard deviation of 4 measurements.

TABLE 2

Composition and characteristics of the experimental diets used during the growing-fattening phase

| Ingredients (%) | A2 | B2 | C2 | D2 |
|---|---|---|---|---|
| Maize | | | 53 | |
| Soybean meal | | | 18.2 | |
| Barley | | | 13 | |
| Oat meal | | | 6 | |
| Wheat bran | | | 5.4 | |
| Soya oil | | | 1 | |
| Minerals, vitamins and synthetic aa | | | 3.4 | |
| Digestible energy - MJ/kg | | | 13.31 | |
| Crude protein - N × 6.25 | | | 15.5 | |
| Lysine - % | | | 0.96 | |
| Methionine + cystine (%) | | | 0.54 | |
| Phosphorus (%) | | | 0.41 | |
| Calcium (%) | | | 0.66 | |
| Benzoic acid % | — | 1 | 0.5 | 1 |
| Benzoic acid in feed % | — | 0.99 ± 0.05(1) | 0.51 ± 0.02(1) | 0.94 ± 0.04(1) |
| Benzoic acid % of the target | — | 99 | 102 | 94 |

(1)Mean ± standard deviation of 4 measurements.

TABLE 3

Effects of the addition to the diet comprising benzoic acid on the bone resistance and mineralization of the growing-fattening pig.

| Variable | A2 | B2 | C2 | D2 |
| --- | --- | --- | --- | --- |
| Resistance (Newton at the breaking point) | | | | |
| Right metacarpals | 490 ± 104$^{(1)ac}$ (100) | 625 ± 163$^{(2)bd}$ (128) | 621 ± 172$^{(2)d}$ (127) | 597 ± 192$^{(2)d}$ (122) |
| Mineralization (% of ash in DM) | | | | |
| Right metacarpals | 59.08 ± 1.40$^{(1)c}$ (100) | 60.26 ± 1.31$^{(1)d}$ (102) | 60.06 ± 1.33$^{(1)cd}$* (102) | 60.14 ± 1.09$^{(1)d}$ (102) |

A2 - 0% of benzoic acid during 32 days and 0% of benzoic acid during 91 days,
B2 - 0% of benzoic acid during 32 days and 1% of benzoic acid during 91 days,
C2 - 0.5% of benzoic acid during 32 days and 0.5% of benzoic acid during 91 days and
D2 - 0.5% of benzoic acid during 32 days and 1% of benzoic acid during 91 days
Animals: growing pigs of an initial body weight of 21.7 ± 2.17 kg;
Diet based on: maize, barley and soybean meal;
$^{(1)}$Mean ± standard deviation of 32 measurements;
$^{a,b,c}$Mean values within a row with unlike superscript letters were significantly different:
$^{a-b}p < 0.01$,
$^{c-d}p < 0.05$;
**$p < 0.07$.

The invention claimed is:

1. A method for increasing bone resistance and mineralization in an animal, which comprises providing to the animal for ingestion of the feed an effective amount of benzoic acid or an alkali metal or alkaline earth metal or ammonium salt thereof which is present as an ingredient of the feed ingested by the animal.

2. A method as in claim 1, wherein a bone resistance of at least 550 N measured with metacarpal bone is achieved.

3. A method as in claim 2, wherein the bone resistance of at least 590 to 650 N measured with metacarpal bone is achieved.

4. A method according to claim 1, wherein a bone mineralization of at least 60% of ash compared to the dried bone matter (DM) is achieved.

5. A method according to clam 1, wherein the benzoic acid or a salt thereof is used in an amount sufficient to provide a daily dosage of 20 mg per kg body weight to about 60 mg per kg body weight of the subject to which it is to be administered.

6. A method according to claim 1, wherein the animal is selected from poultry, pigs and cattle.

* * * * *